United States Patent [19]

Yokoi et al.

[11] Patent Number: 4,483,304
[45] Date of Patent: Nov. 20, 1984

[54] FUEL VAPORIZER FOR INTERNAL COMBUSTION ENGINES

[75] Inventors: Yutaka Yokoi; Kenji Fujikake, both of Nagoya, Japan

[73] Assignee: Kabushiki Kaisha Toyota Chuo Kenkyusho, Aichi, Japan

[21] Appl. No.: 341,145

[22] Filed: Jan. 20, 1982

[30] Foreign Application Priority Data

Jan. 26, 1981 [JP] Japan .................................. 56-9887

[51] Int. Cl.³ .......................................... F02M 31/00
[52] U.S. Cl. .................................... 123/549; 123/552; 219/543
[58] Field of Search ............... 123/549, 548, 547, 552; 219/543

[56] References Cited

U.S. PATENT DOCUMENTS 2,475,379  7/1949  Stong .............................. 219/543 X
2,882,377  4/1959  Rinehart ......................... 219/543 X
3,177,341  4/1965  DeWoody et al. ............. 219/543 X
4,356,804  11/1982 Igashira et al. ..................... 123/549
4,377,148  3/1983  Ishida .................................. 123/549

Primary Examiner—Parshotam S. Lall
Assistant Examiner—W. R. Wolfe
Attorney, Agent, or Firm—Oblon, Fisher, Spivak, McClelland & Maier

[57] ABSTRACT

A fuel vaporizer for internal combustion engines is disposed at a suitable position in an intake passage of a carburetor or an intake manifold. The fuel vaporizer comprises a heating cylinder installed in registry with a barrel of the carburetor or a heating plate embedded in a wall of the intake manifold. The heating cylinder or plate includes a base body of electrically and thermally insulative ceramics coated on a surface thereof with a thin film of electrically resistive material such as metal capable of being heated when an electric current flows therethrough, the thin film lying substantially flush with the wall of the intake passage and being electrically connected to a power supply via a switch. When the heating cylinder or plate is heated, it effectively and reliably evaporates fuel in liquid phase flowing down the intake passage into contact with the heated thin film.

7 Claims, 8 Drawing Figures

FUEL VAPORIZER FOR INTERNAL COMBUSTION ENGINES

BACKGROUND OF THE INVENTION

1. Field of the Invention

The present invention relates to a fuel vaporizer for internal combustion engines for promoting vaporization of fuel films or particles attached to the wall of an intake passage by heating such fuel films or particles.

2. Description of the Prior Art

Fuel supplied to internal combustion engines tends to form films or large particles or droplets, instead of being finely vaporized, and become attached to the inner wall of an intake passage when the engine is started or is driven at low speeds. When such fuel films or droplets are present in the engine, the exhaust gas emitted therefrom contains an increased amount of harmful pollutants such as carbon monoxide and hydrocarbons, and the distribution of an air-fuel mixture among engine cylinders is poor. It is known that by heating the fuel films or large fuel droplets for evaporation, the exhaust gas is cleaned, and the air-fuel mixture gets distributed evenly among the engine cylinders, resulting in smooth engine operation.

There has been proposed a fuel vaporizer comprising a sheath heater composed of an electrical resistor or a thermistor having a positive temperature coefficient of resistance (PTC thermistor) for heating and evaporating fuel films or droplets flowing down or attached to the intake passage wall at the time of starting the engine under cold conditions. Although the proposed fuel vaporizer is effective to evaporate fuel droplets or films, it consumes a large amount of electrical power and takes a long period of time before it is heated to a desired temperature since the heater needs to be internally or bodily heated. Use of the known fuel vaporizer oftentimes requires an increase in the capacity of the generator and storage battery provided on the car for energizing the fuel vaporizer.

SUMMARY OF THE INVENTION

It is an object of the present invention to provide a fuel vaporizer for internal combustion engines which can evaporate fuel films or droplets in an intake passage at an increased rate.

Another object of the present invention is to provide a fuel vaporizer for internal combustion engines which is of a small electrical power requirement and has a good thermal efficiency.

Still another object of the present invention is to provide a fuel vaporizer for internal combustion engines which can be heated up to a desired temperature for evaporating fuel films or particles within a short period of time.

According to the present invention, a fuel vaporizer for an internal combustion engine comprises a cylindrical or flat base body of thermally insulative ceramics coated on a surface thereof with a thin layer such as of nickel capable of being heated when an electric current flows therethrough. The fuel vaporizer is installed at a suitable position in an intake passage such that the heating layer lies substantially flush with a wall of the intake passage. Upon energization of the fuel vaporizer, the thin heating layer exposed in the intake passage is heated to evaporate fuel films or droplets flowing from a carburetor down the intake passage into contact with the heating layer of the fuel vaporizer.

The above and other objects, features and advantages of the present invention will become more apparent from the following description when taken in conjunction with the accompanying drawings in which certain preferred embodiments are shown by way of illustrative example.

DETAILED DESCRIPTION OF THE PREFERRED EMBODIMENTS

Figure 1:
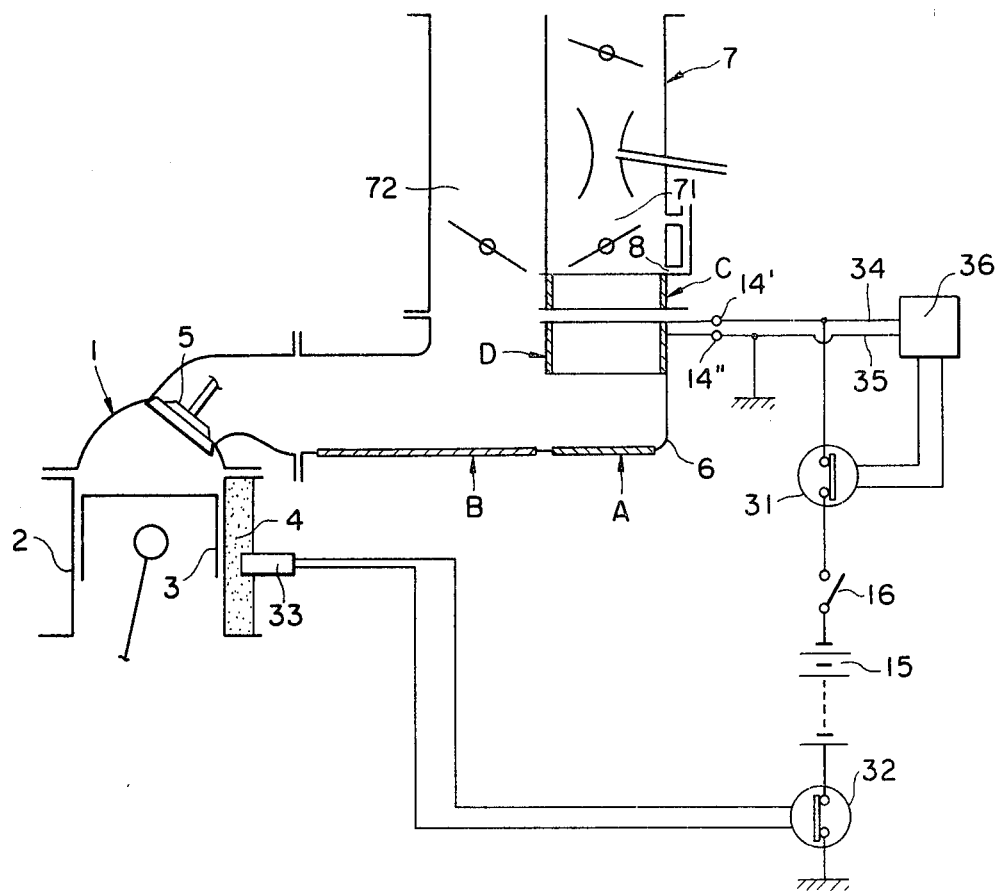
FIG. 1 is schematic view of an intake system for an internal combustion engine to which the present invention is applied.

FIG. 1 shows an intake system for an internal combustion engine 1 having a cylinder 2, a piston 3 reciprocatingly movable in the cylinder 2, and a water jacket 4 fitted around the cylinder 2, the intake system comprising an intake valve 5 mounted on the cylinder head, an intake manifold 6 connected to the cylinder head, and a carburetor 7 for supplying an air-fuel mixture into the intake manifold 6, the carburetor 7 having a slow jet nozzle 8. The reference characters A, B, C, and D indicate shapes and positions of installation of various heaters or fuel vaporizers according to the present invention. The heaters A and B are each in the form of a plate which may be flat or arcuate, the heater A being mounted on a wall of the intake manifold 6 that is immediately below the slow jet nozzle 8, and the heater B being disposed in the intake manifold 6 downstream of the position of the heater A. The heaters C and D are cylindrical in shape. The heater C is mounted in the carburetor 7, and the heater D is disposed at an inlet of the intake manifold 6 which is located downstream of the carburetor 7.

Figure 2:
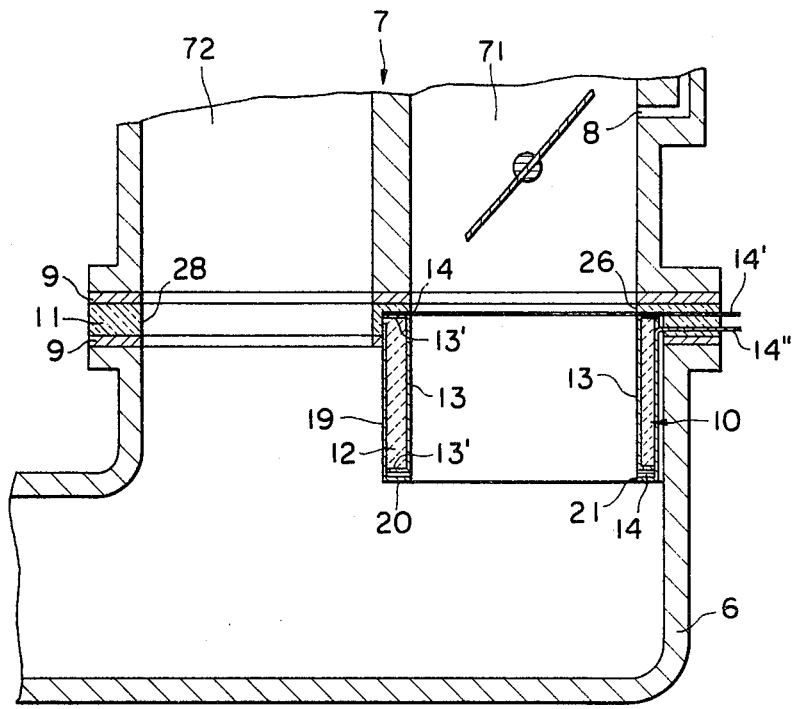
FIG. 2 is a cross-sectional view of a fuel vaporizer constructed in accordance with a first embodiment of the present invention, the fuel vaporizer being shown as incoporated in an intake system of an engine.
Figure 3:
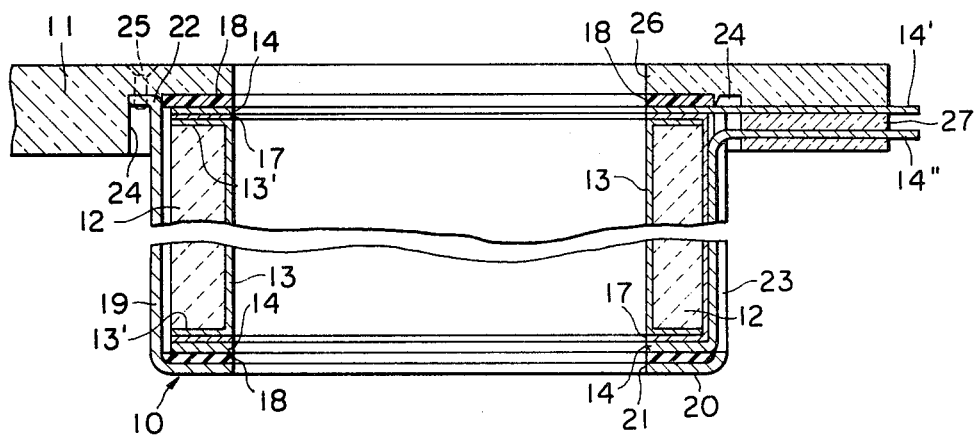
FIG. 3 is an enlarged fragmentary cross-sectional view of the fuel vaporizer shown in FIG. 2.
Figure 4:
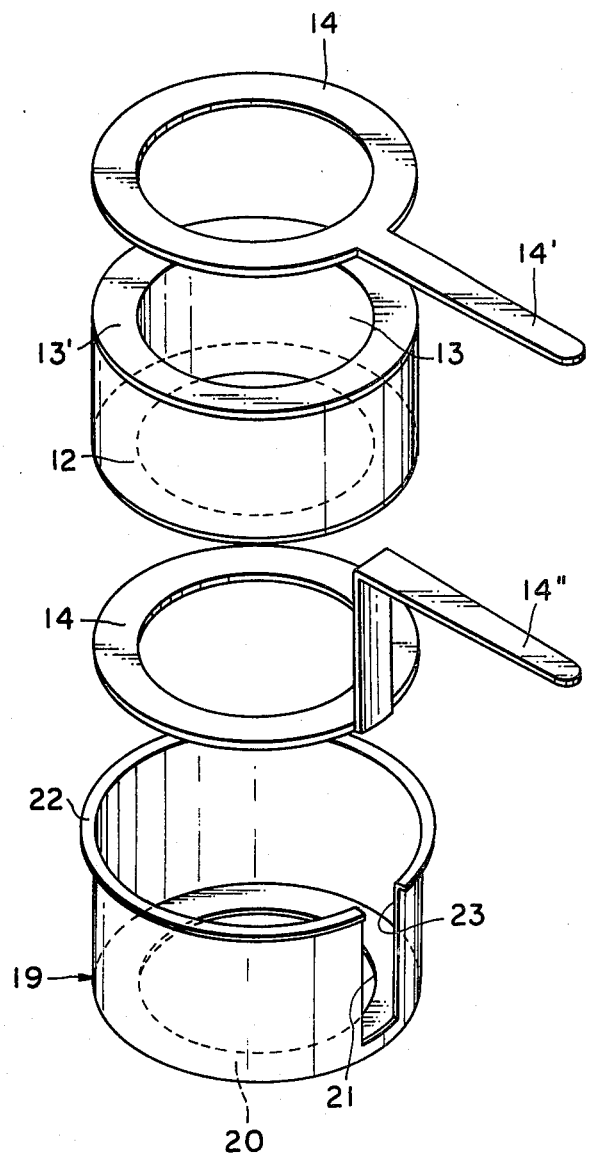
FIG. 4 is an exploded perspective view of the fuel vaporizer of FIG. 2.

FIGS. 2, 3 and 4 illustrate a heater or fuel vaporizer of the invention as installed in the position D of FIG. 1. The carburetor 7 is of the two-barrel type. A support plate 11 of an insulating material such as Bakelite is interposed between the carburetor 7 and the intake manifold 6 with gaskets 9, 9 therebetween. The support plate 11 supports a heating cylinder 10 which comprises a cylindrical base body 12 of baked ceramics which is highly thermally insulative, the cylindrical base body 12 having an inner peripheral surface and end faces plated with layers 13, 13' of (hereinafter referred to as nickel plated layer or film) nickel each having a thickness of 0.5 micron. The nickel plated layers 13' on the end faces of the base body 12 are connected to electrodes 14 coupled via a switch 16 (FIG. 1) to a power supply 15, that is, a storage battery 15 mounted on the automobile. When the switch 16 is closed, an electric current flows through the nickel plated layers, which are then heated.

As better shown in FIG. 3, each of the nickel plated layers 13' on the end faces of the base body 12 has on its surface a coating of electrically conductive paint 17 against which there is pressed one of the electrodes 14, which is of the same annular shape as the cross-sectional shape of the cylindrical base body 12. Rings 18 of an elastomeric insulating material such as silicone rubber are held respectively against the outer surfaces of the annular electrodes 14, 14, each of the rings 18 having a circular hole of the same shape as the inner peripheral surface of the cylindrical base body 12. The cylindrical base body 12, the nickel plated layers 13, 13', the coatings 17 of paint, the annular electrodes 14, and the rings 18 as they are assembled are insulatively housed in a metal container 19. As shown in FIG. 4, the metal container 19 is of a bottomed cylindrical configuration having an inside diameter slightly larger than the outside diameter of the base body 12. The bottomed end 20 of the metal container 19 has a circular opening 21 of the same diameter as the inside diameter of the cylindrical base body 12. The metal container 19 has an annular flange 22 at its open end axially opposite to the bottomed end, the annular flange 22 being directed radially outwardly. The sidewall of the metal container 19 has a slot 23 extending parallel to the central axis thereof from a position near the bottom 20 to the open end of the metal container 19, the slot 23 being also defined partly in the annular flange 22. As assembled, one end of the base body 12 is held against the bottom 20 of the metal container 19 with one of the insulative rings 18 interposed therebetween, and the other end of the base body 12 is disposed in a recess 24 in the support plate 11 and held against the bottom of the recess 24 with the other insulative ring 18 interposed therebetween, there being a slight clearance left between the outer periphery of the base body 12 and the sidewall of the metal container 19 as illustrated in FIG. 3. The metal container 19 is attached to the support plate 11 by means of screws 25 extending through the support plate 11 into threaded engagement with the annular flange 22 of the metal container 19.

The support plate 11 has a circular hole 26 having a diameter equal to the inside diameter of the base body 12. Thus, the holes in the rings 18, the annular electrodes 14, the opening 21 in the metal container 19, the circular hole 26 in the support plate 11, and the central hole in the base body 12 jointly define an uninterrupted cylindrical surface. The annular electrode 14 mounted on the upper end of the base body 12 as shown in FIGS. 3 and 4 has a narrow leading portion 14' extending through the support plate 11 or otherwise attached thereto and projecting out of the support plate 11. The annular electrode 14 disposed on the lower end of the base body 12 includes a narrow leading portion 14" bent axially along the outer periphery of the base body 12 and disposed in the slot 23 in insulating relation to the metal container 19. The narrow leading portion 14" extends through the support plate 11 or with an insulating plate 27 disposed between the leading portion 14" and the leading portion 14', and projects out of the support plate 11.

The circular hole 26 in the support plate 11 is of the same diameter as the inside diameter of an intake passage 71 on the primary side of the two-barrel carburetor 7. The support plate 11 also has a circular hole 28 of the same diameter as the inside diameter of an intake passage 72 on the secondary side of the two-barrel carburetor 7. When the support plate 11 on which the heating cylinder 10 is mounted is attached to the carburetor 7 with the circular holes 26, 28 held in registry with the primary and secondary intake passages 71, 72, respectively, the heating cylinder 10 is disposed in the intake manifold 6 with the inner surface of the nickel plated layer 13 on the inner periphery of the base body 12 lying flush with the inner periphery of the primary intake passage 71 of the carburetor 7.

An electrical circuit for energizing the heating cylinder 10 comprises, as illustrated in FIG. 1, a first normally closed electromagnetic switch 31 through which the leading portion 14' of one of the electrodes 14, 14 is connected in series with the switch 16 that is connected to the storage battery 15, and a second normally closed electromagnetic switch 32 through which the other terminal of the storage battery 15 is grounded. The leading portion 14" of the other electrode 14 is grounded.

The second electromagnetic switch 32 serves as a conduction limiting device connected to a temperature sensor 33 attached to the water jacket 4 of the internal combustion engine 1. When the coolant water in the water jacket 4 is heated to a temperature higher than a predetermined temperature, the temperature sensor 33 produces an output which opens the second electromagnetic switch 32. The first electromagnetic switch 31 serves as an overheat preventing device connected to an elemental resistor 36 that is coupled to the leading portion 14' by lead wires 34, 35. When the resistive nickel layer 13 is overheated or heated beyond a predetermined temperature due to a variation in the temperature coefficient of resistance thereof, and the resistance of the elemental resistor 36 is varied to a predetermined value, the elemental resistor 36 produces an output which opens the first electromagnetic switch 31.

The fuel vaporizer thus constructed will operate as follows. When the internal combustion engine is started under cold conditions, the switch 16 is manually closed simultaneously with starting of the engine to supply an electric current from the storage battery 15 to the nickel plated film 13, whereupon the latter is heated. Then large fuel particles or droplets in an air-fuel-mixture formed by the carburetor, or fuel films flowing from the slow jet nozzle 8 down the inner wall of the intake passage 71 are evaporated upon contact with the heated nickel film 13. The vaporized fuel then enters the engine cylinder 2 through the intake valve 5. Since the nickel film 13 is thin, it can be heated with a small amount of electric power and within a short period of time. Therefore, the thin film 13 as heated serves to evaporate fuel right after the engine is started under cold conditions. With the thin film 13 coated on the thermally insulative base body 12 of ceramics, heat generated by the film 13 will not be transmitted to surrounding parts and can be put to efficient use for fuel vaporization. When the internal combustion engine 1 reaches a predetermined temperature after it has been started, the conduction limiting device or the second normally closed electromagnetic switch 32 is opened by an output from the temperature sensor 33 to stop energization of the thin film 13 of the fuel vaporizer. When the thin film 13 is overheated, the overheat preventing device or the first normally closed electromagnetic switch 31 is opened by an output from the elemental resistor 36 to stop energization of the thin film 13. Thus, the fuel vaporizer operates economically and safely.

Figure 5:
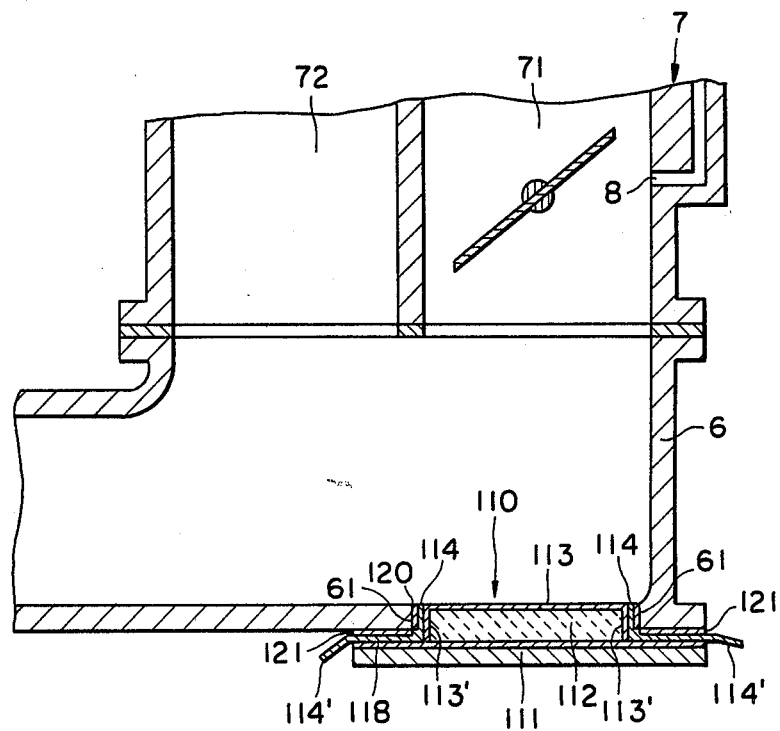
FIG. 5 is a cross-sectional view of a fuel vaporizer according to a second embodiment of the present invention.

FIG. 5 illustrates a fuel vaporizer according to a second embodiment, as provided at the position A shown in FIG. 1. An intake manifold 6 has in its wall a rectangular opening 61 located just below a primary intake passsage 71 of a two-barrel carburetor 7. A heating plate 110 is fitted in the rectangular opening 61. The heating plate 110 comprises a rectangular, base body 112 of highly thermally insulative ceramics plated on a surface thereof with a thin film 113 of plated nickel having a thickness of 0.1 micron. The base body 112 also has two opposite sides thereof plated with films 113' of nickel connected to the plated film 113 and having a thickness of 20 microns. A pair of electrodes 114 are fused to the plated films 113', respectively, and have leading portions 114' bent outwardly. A rectangular insulative sheet 118 having a larger area than the exposed area of the base body 112 is held against the outer surface of the latter, and is backed with a metal support plate 111 identical in shape to the sheet 118 and bonded thereto with an insulative adhesive. A thermally and electrically insulative sheet 120 is wound around the periphery of the base body 112. The heating plate 110 is detachably mounted on the intake manifold 6 at the rectangular opening 61 thereof by the support plate 111 such that the plate film 113 of nickel lies flush with the inner wall surface of the intake manifold 6. A thermally and electrically insulative sheet 121 is interposed between the intake manifold 6 and upper surfaces of the leading portions 114' of the electrodes 114. The leading portions 114' are connected to an electric control circuit which is of the same circuit arrangement as that shown in FIG. 1.

When the switch 16 is closed simultaneously with starting of the internal combustion engine under cold conditions, the plated film 113 of nickel is heated and vaporizes fuel droplets in an air-fuel mixture supplied from the carburetor, and fuel films flowing from the slow jet nozzle 8 down the intake passage 71 into the intake manifold 6 upon contact with the heated film 113.

Figure 6:
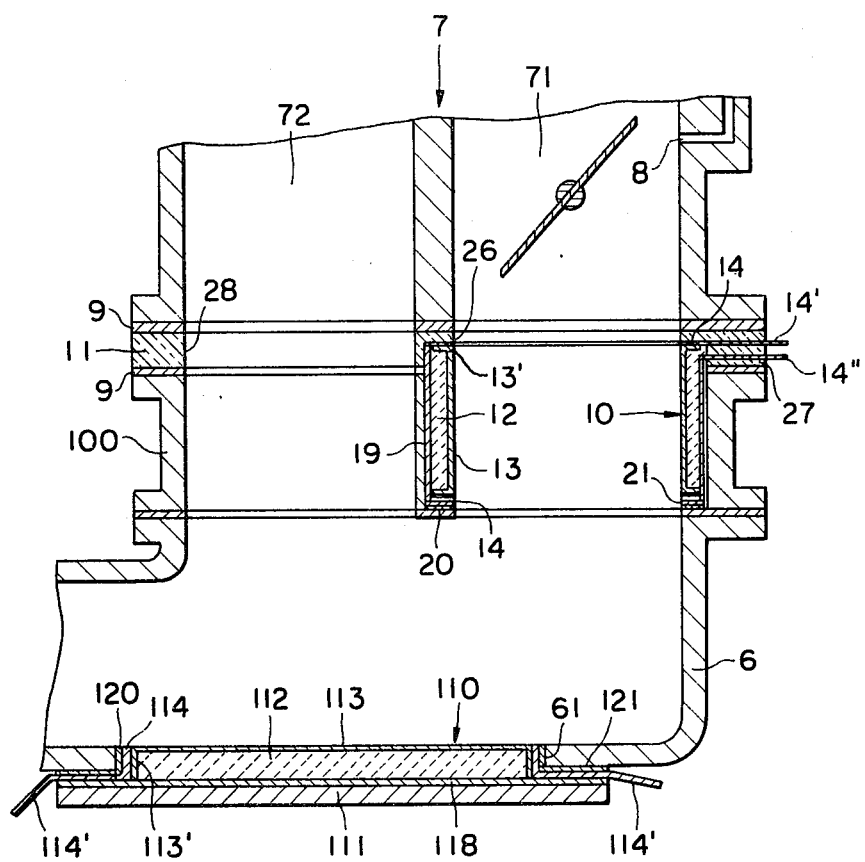
FIG. 6 is a cross-sectional view showing the fuel vaporizers of FIGS. 2 and 5 as cooperatively installed in an intake system of an engine.

FIG. 6 shows an arrangement in which the heating cylinder 10 as shown in FIGS. 2 and 3 is installed at the position C of FIG. 1, and the heating plate 110 as shown in FIG. 5 is put in the position B of FIG. 1. A short connecting cylinder 100 is interposed between the carburetor 7 and the intake manifold 6. The heating cylinder 10 as supported by the support plate 11 is mounted in both the connecting cylinder 100 and the carburetor 7, with the nickel plated film 13 lying flush with the inner wall surface of the intake manifold 6. The heating plate 110 is located immediately below the secondary intake passage 72 of the carburetor 7 and mounted on the intake manifold 6. Identical parts are denoted by identical reference numerals throughout FIGS. 1 through 6.

With the construction shown in FIG. 6, the heating cylinder 10 serves to evaporate fuel films flowing from the slow jet nozzle 8 down the inner wall surface of the intake passage 71 upon contact with the heated film 13, and the heating plate 110 serves to vaporize fuel droplets formed by the carburetor 7 and entering the intake manifold 6 upon contact with the heated film 113. Accordingly, fuel in liquid phase as it leaves the carburetor 7 can be vaporized at an increased rate.

With the arrangements of the present invention, only the thin resistive film coated on the heating cylinder or plate is heated when an electric current flows therethrough, and hence can be heated in a short period of time to a temperature high enough to evaporate fuel droplets or films flowing into contact therewith. Since the thin film is coated on the body of electrically and thermally insulative ceramics, generated heat will not be transmitted to surrounding parts or absorbed thereby, so that the heat is available almost exclusively for fuel evaporation. The fuel vaporizer of the invention can be heated much faster and with less electric power than conventional vaporizers employing sheath heaters and PTC thermistors. The thin film on the base body lying substantially flush with the inner wall surface of the intake passage gives no resistance to the flow of an air-fuel mixture supplied from the carburetor through the intake passage. With the heating cylinder disposed in registry with the intake passage downstream of the slow jet nozzle of the caburetor, the heated thin film can evaporate fuel films or droplets ejected and flowing from the slow jet nozzle down the intake passage into contact with the heating cylinder. The flat heating plate installed in the intake manifold wall, when heated, vaporize fuel droplets and films flowing from the carburetor into the intake manifold. The heating cylinder having its downstream end projecting as a free end into the intake manifold causes more fuel droplets to tend to be attached to the heating cylinder due to the air flow deflected at the free end thereof, resulting in a greater rate of fuel evaporation.

The electrically and thermally insulative ceramics may comprise glass, porcelain, or other ordinary ceramics materials. The resistive thin film may also be of other metals such as chromium which is plated or coated by way of vacuum deposition, resistive platinum paste coated and baked on the ceramics body, or a mixture of carbon or tungsten powder and glass powder coated and baked on the ceramics body. The thickness of the thin film should be as small as possible to reduce its thermal capacity. For example, the plated or vapor-deposited metal film should be of a thickness of from 0.1 to 1 micron, and the thin film of baked resistive paste, carbon, and tungsten powder should be of a thickness ranging from 10 to 100 microns. The thin film may be coated on its surface with a thin layer of glass to prevent the film from being corroded or oxidized by fuel brought into contact therewith.

Figure 7:
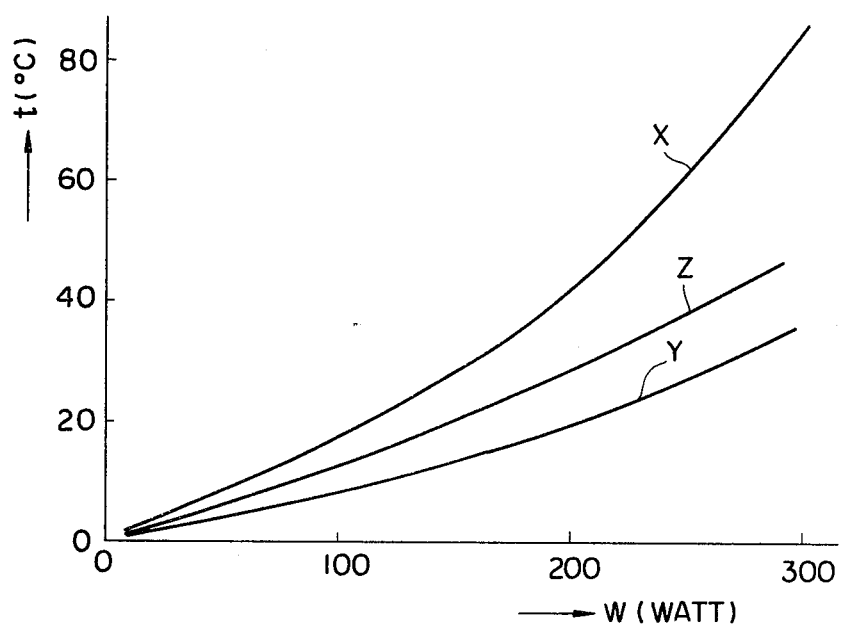
FIG. 7 is a graph showing surface temperatures of a fuel vaporizer of the invention and conventional fuel vaporizers, plotted against amounts of electric power consumed by the fuel vaporizers.

The heating cylinder 10 as shown in FIGS. 2 and 3 and PTC thermistors having the same surface area and thickness as those of the heating cylinder 10 were tested in an experiment to plot temperatures t (°C.) of the heated surfaces against amounts of electric power (W) consumed by the fuel vaporizers, the results being shown in FIG. 7. Designated at X, Y, and Z are characteristic curves of the fuel vaporizer of the invention, the heating cylinder of PTC thermistor, and the heating plate of PTC thermistor, respectively. It can be seen from the graph that the heating cylinder of the invention can be heated to a desired temperature with a less amount of electric power than that needed to heat the conventional fuel vaporizers, and hence a thermal energy can efficiently be put to use by the heating cylinder of the invention. The experiment has indicated that the electrical energy needed to heat the heating cylinder of the invention for 5° C./sec. was about 150 watts, whereas the electrical energy needed to heat the heating cylinder of PTC thermistor (the curve Y in FIG. 7) for 5° C./sec. was 600 watts. With the thin resistive film energizable for heating, the rate of temperature increase per second for the heating surface is much higher than that of the internally heated PTC thermistor heating cylinder, and hence consumes a smaller amount of electric power when it is energized at the time of starting an internal combustion engine.

According to another experiment, various fuel vaporizers were installed at the position D of FIG. 1, and the internal combustion engine was operated in an idling mode of operation under certain conditions, i.e., the minimum pressure in the intake pipe was −430 mm Hg, and the rate of flow of fuel supplied from the carburetor was Gf =0.4 g/sec. The ratio between the rate of flow of fuel Gf supplied from the carburetor to the intake manifold, and the amount of fuel Gfl in liquid phase out of the total fuel supplied, which flows down the inner wall surface of the intake manifold, is indicated on the ordinate of the graph of FIG. 8, and the amount of electric power supplied to the fuel vaporizers on the abscissa.

Figure 8:
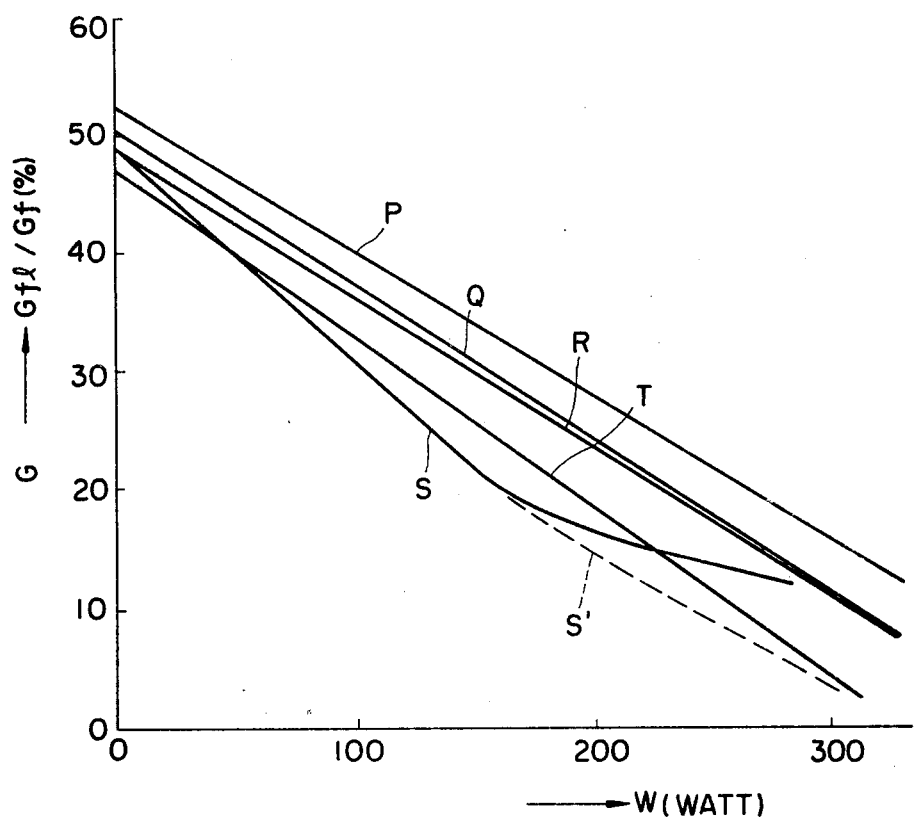
FIG. 8 is a graph showing ratios of the amount of liquid-phase fuel to the overall amount of fuel supplied from a carburetor to an internal combustion engine, plotted against amounts of electric power consumed by fuel vaporizers.

The lines P, Q, R, and S in FIG. 8 are indicative of experimental data for a heating cylinder of PTC thermistor, a heating cylinder of nichrome, a honeycomb-shaped heater of PTC thermistor, and a heating cylinder as shown in FIGS. 2 through 4, respectively, installed at position D. The lines P, Q, R exhibit substantially the same tendency in which the amount of fuel in liquid phase is large when the supplied amount of electric power is small or the temperature of the heaters is low, and the fuel in liquid phase becomes reduced by being evaporated as the amount of electric power supplied is increased and hence the heater temperature is raised. The heating cylinder of PTC thermistor (P), the heating cylinder of nichrome (Q), and the honeycomb heater structure of PTC thermistor (R) exhibit good fuel vaporization in the order mentioned. However, the line S for the heating cylinder according to the present invention has a greater gradient than the lines P, Q, R, that is, more fuel can be evaporated in the present invention with the increase in electric power supplied. Such an advantage of the heating cylinder of the invention is accounted for by the fact that the heater is in the form of a thin film, and the thin film is backed with the thermally insulative body of ceramics to allow generated heat to be put to efficient use for fuel evaporation. The line S becomes progressively less slanted beyond about 150 watts since the surface temperature of the heater is too high for the power zone greater than 150 watts, causing liquid fuel in contact with the heater to boil with the result of poor thermal transfer. This shows that the thin-film heater which is thermally shielded by the insulative body against thermal leakage can be heated to high temperatures with a small amount of electric power supplied thereto. The curve S beyond the point of 150 watts can be improved so as to follow the dotted line S' by changing the way in which the liquid fuel is brought into contact with the heater film and distributed thereover.

The line T in FIG. 8 is indicative of experimental data for a heater plate of PTC thermistor as installed in the position A of FIG. 1.

A study of FIG. 8 shows that only about 50% of the total fuel supplied from the carburetor to engine cylinders is vaporized while the engine is idling, and the fuel vaporizer of the present invention is highly effective to promote the evaporation of the rest of the fuel in liquid form.

Although specific embodiments of the invention have been illustrated and described, it will be understood that various alterations may be made therein without departing from the scope of the invention as defined by the appended claims.

What is claimed is:

1. A fuel vaporizer for an internal combustion engine having an intake passage extending through a carburetor and an intake manifold, in which a slow jet nozzle is opened, said fuel vaporizer comprising:
   a heating cylinder adapted to be mounted downstream of the slow jet nozzle in concentric relation to the intake passage, wherein said heating cylinder further comprises a cylindrical base body of electrically and thermally insulative ceramics and a coating on an inner peripheral surface thereof of a thin film of electrically resistive material for being heated when an electric current flows therethrough, said thin film being substantially flush with an inner wall of the intake passage, and
   a power supply connected to said thin film, whereby said thin film when heated evaporates fuel in liquid phase flowing down the intake passage and contacting said thin film
   wherein said thin film is formed of one of a group comprising nickel, chromium, platinum, powder of carbon and glass, and powder of tungsten and glass and wherein said thin film further comprises a nickel plated film.

2. A fuel vaporizer for an internal combustion engine having an intake passage extending through a carburetor and an intake manifold, in which a slow jet nozzle is opened, said fuel vaporizer comprising:
   a heating cylinder adapted to be mounted downstream of the slow jet nozzle in concentric relation to the intake passage, wherein said heating cylinder further comprises a cylindrical base body of electrically and thermally insulative ceramics and a coating on an inner peripheral surface thereof of a thin film of electrically resistive material for being heated when an electric current flows therethrough, said thin film being substantially flush with an inner wall of the intake passage, and
   a power supply connected to said thin film, whereby said thin film when heated evaporates fuel in liquid phase flowing down the intake passage and contacting said thin film wherein said thin film further comprises a plated film having a thickness of from 0.1 to 1 micron.

3. A fuel vaporizer for an internal combustion engine having an intake passage extending through a carburetor and an intake manifold, in which a slow jet nozzle is opened, said fuel vaporizer comprising:
   a heating cylinder adapted to be mounted downstream of the slow jet nozzle in concentric relation to the intake passage, wherein said heating cylinder further comprises a cylindrical base body of electrically and thermally insulative ceramics and a coating on an inner peripheral surface thereof of a thin film of electrically resistive material for being heated when an electric current flows therethrough, said thin film being substantially flush with an inner wall of the intake passage, and
   a power supply connected to said thin film, whereby said thin film when heated evaporates fuel in liquid phase flowing down the intake passage and contacting said thin film wherein said thin film further comprises a paste-coated film having a thickness of from 10 to 100 microns.

4. A fuel vaporizer for an internal combustion engine having an intake passage extending through a carburetor and an intake manifold, in which a slow jet nozzle is opened, said fuel vaporizer comprising:

a heating cylinder adapted to be mounted downstream of the slow jet nozzle in concentric relation to the intake passage, wherein said heating cylinder further comprises a cylindrical base body of electrically and thermally insulative ceramics and a coating on an inner peripheral surface thereof of a thin film of electrically resistive material for being heated when an electric current flows therethrough, said thin film being substantially flush with an inner wall of the intake passage, and a power supply connected to said thin film, whereby said thin film when heated evaporates fuel in liquid phase flowing down the intake passage and contacting said thin film wherein said thin film further comprises a coating on a surface thereof of a thin layer of glass to prevent said thin film from being corroded or oxidized.

5. A fuel vaporizer for an internal combustion engine having an intake passage extending through a carburetor and an intake manifold, in which a slow jet nozzle is opened, said fuel vaporizer comprising:

a heating cylinder adapted to be mounted downstream of the slow jet nozzle in concentric relation to the intake passage, wherein said heating cylinder further comprises a cylindrical base body of electrically and thermally insulative ceramics and a coating on an inner peripheral surface thereof of a thin film of electrically resistive material for being heated when an electric current flows therethrough, said thin film being substantially flush with an inner wall of the intake passage, a power supply connected to said thin film, whereby said thin film when heated evaporates fuel in liquid phase flowing down the intake passage and contacting said thin film; and an elemental resistor and a switch connected to said elemental resistor for preventing overheating of said thin film.

6. A fuel vaporizer for an internal combustion engine having an intake passage extending through a carburetor and an intake manifold, in which a slow jet nozzle is opened, said fuel vaporizer comprising:

a heating cylinder adapted to be mounted downstream of the slow jet nozzle in concentric relation to the intake passage, wherein said heating cylinder further comprises a cylindrical base body of electrically and thermally insulative ceramics and a coating on an inner peripheral surface thereof of a thin film of electrically resistive material for being heated when an electric current flows therethrough, said thin film being substantially flush with an inner wall of the intake passage, and a power supply connected to said thin film, whereby said thin film when heated evaporates fuel in liquid phase flowing down the intake passage and contacting said thin film wherein said thin film further comprises a painted film having a thickness of from 10 to 100 microns.

7. A fuel vaporizer for an internal combustion engine having an intake passage extending through a carburetor and an intake manifold, in which a slow jet nozzle is opened, said fuel vaporizer comprising:

a heating cylinder adapted to be mounted downstream of the slow jet nozzle in concentric relation to the intake passage, said heating cylinder further comprises a cylindrical base body of electrically and thermally insulative ceramics and a coating on an inner peripheral surface thereof of a thin film of electrically resistive material for being heated when an electric current flows therethrough, said thin film being substantially flush with an inner wall of the intake passage, and a power supply connected to said thin film, whereby said thin film when heated evaporates fuel in liquid phase flowing down the intake passage and contacting said thin film wherein said thin film further comprises a vapor-deposited film having a thickness of from 0.1 to 1 micron.

* * * * *